(12) United States Patent
Scott et al.

(10) Patent No.: US 10,339,073 B2
(45) Date of Patent: Jul. 2, 2019

(54) SYSTEMS AND METHODS FOR REDUCING WRITE LATENCY

(71) Applicant: Keysight Technologies, Inc., Minneapolis, MN (US)

(72) Inventors: Peter A Scott, Boulder, CO (US); Robert D Gronlund, Fort Collins, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 176 days.

(21) Appl. No.: 15/636,906

(22) Filed: Jun. 29, 2017

(65) Prior Publication Data

US 2019/0004979 A1  Jan. 3, 2019

(51) Int. Cl.
*G06F 9/30* (2018.01)
*G06F 13/16* (2006.01)
*G06F 11/07* (2006.01)
*G06F 9/44* (2018.01)
*G06F 16/14* (2019.01)

(52) U.S. Cl.
CPC ...... *G06F 13/1631* (2013.01); *G06F 9/30189* (2013.01); *G06F 9/44* (2013.01); *G06F 11/0706* (2013.01); *G06F 16/14* (2019.01)

(58) Field of Classification Search
CPC .... G06F 13/1631; G06F 9/44; G06F 9/30189; G06F 17/301; G06F 11/0706; G06F 13/14; G06F 13/16; G06F 9/30; G06F 11/07; G06F 17/30; G06F 17/30091;
(Continued)

(56) References Cited

U.S. PATENT DOCUMENTS 7,003,702 B2 * 2/2006 Budd .................. H03M 13/096
714/48
7,779,207 B2  8/2010 Pudipeddi
(Continued)

FOREIGN PATENT DOCUMENTS

WO  2014133497 A1  9/2014

OTHER PUBLICATIONS

UK Combined Search and Examination Report dated Dec. 21, 2018, Application No. GB 1809803.8, 5 pgs.
(Continued)

*Primary Examiner* — Mano Padmanabhan
*Assistant Examiner* — Jean C Edouard

(57) ABSTRACT

A computer system having reduced write latency and methods for use in computer systems for reducing write latency are provided. Processing circuitry of the computer system is configured to execute a volume filter driver (VFD) that can be switched between a fast termination (FT) mode of operations and a normal, or quiescent, mode of operations. When the processing circuitry receives input/output (IO) write requests to write data to memory while the VFD is in the FT mode of operations, the VFD causes metadata associated with received IO write requests to be written to a volume of memory while preventing actual data associated with received IO write requests from being written to the volume, thereby resulting in extremely fast FT mode operation. After the file has been written to the volume, the VFD enters the quiescent mode of operations during which the VFD passes all IO write requests to the volume.

27 Claims, 7 Drawing Sheets

(58) Field of Classification Search
CPC ............... G06F 17/30943; G06F 12/08; G06F 12/0246; G06F 12/0804
USPC ........................................................ 711/161
See application file for complete search history.

(56) References Cited

U.S. PATENT DOCUMENTS

| | | | |
|---|---|---|---|
| 9,213,717 B1* | 12/2015 | Pawar | G06F 16/1774 |
| 9,389,805 B2* | 7/2016 | Cohen | G06F 3/0679 |
| 9,760,574 B1* | 9/2017 | Zhai | G06F 3/06 |
| 2007/0276885 A1* | 11/2007 | Valiyaparambil | G06F 11/1451 |
| 2009/0150581 A1* | 6/2009 | Chimitt | G06F 3/0604 |
| | | | 710/74 |
| 2009/0327807 A1* | 12/2009 | Varadarajan | G06F 11/1438 |
| | | | 714/15 |
| 2010/0153632 A1 | 6/2010 | Lee et al. | |
| 2010/0250852 A1* | 9/2010 | Nakayama | G06F 8/60 |
| | | | 711/118 |
| 2013/0042056 A1* | 2/2013 | Shats | G06F 12/0246 |
| | | | 711/103 |
| 2013/0111202 A1* | 5/2013 | Zeng | G06F 9/4401 |
| | | | 713/2 |
| 2016/0011984 A1* | 1/2016 | Speer | G06F 12/0891 |
| | | | 711/102 |
| 2017/0364357 A1* | 12/2017 | Webber | G06F 9/30047 |
| 2018/0225230 A1* | 8/2018 | Litichever | G06F 21/56 |

OTHER PUBLICATIONS

Chang, et al., "An Adaptive File-System-Oriented FTL Mechanism for Flash-Memory Storage Systems", ACM Trans. Embedd. Comput. Syst. 11, 1, Article 9 (Mar. 2012), 19 pages.

\* cited by examiner

SYSTEMS AND METHODS FOR REDUCING WRITE LATENCY

BACKGROUND

A variety of techniques are used to reduce write latency, which is the amount of time that is required to write data to memory of a computer system. When data is written to memory, the data typically includes metadata and actual data. The metadata describes attributes of the actual data. During a typical new file data write operation, the metadata is conditioned (i.e., generated/written, modified or deleted) by the file system (FS) running on the computer system as the actual data is being written to memory. This conditioning of the metadata requires accesses to memory during the data write operations, which adds latency to the write process that is detrimental to the write performance of the computer system.

One known solution for mimimizing FS latency is to implement what is generically known as a custom FS of a type designed to minimize the need to condition metadata as the computer system is writing data to memory. This solution has many disadvantages, including, for example, achieving a correct design and reliable implementation of the custom FS, the need to learn the intricacies and limitations of the storage hardware, the need for extensive verification testing, and the need for the user to learn yet another file system and its controls.

Another known, but less well understood solution (and normally unused due to its use model deficiencies) is known as a "pre-write/write" approach. With the pre-write/write approach, a file of the size to be captured is pre-written with "dummy" data to pre-condition (i.e., write out) the metadata describing the actual data and then the file pointer is re-wound to the beginning address at which writing of the dummy data began. The actual data is then written over the dummy data. If the actual data to be captured is of a very short duration and of known size, and there is not a need for the immediate start of writing, then the pre-write/write approach may be acceptable from a user perspective. Of course for file writes of, for example, an hour in duration, then the initial pre-write pre-conditioning pass may take an hour or longer, which would not be acceptable for nearly all realistic customer applications.

The pre-write/write approach is implemented in a storage performance benchmark tool called CrystalDiskMark that may be used to test the performance of the underlying storage hardware while minimizing the performance degradation caused by the FS. Users of the tool generally understand the length of time they are required to wait to receive results, and the test runs default to relatively short time durations. For each file write test performed by the tool, a "Preparing" status indicator is displayed to the user during the pre-write stage and a "Write" status indicator is displayed to the user during the write stage. These indicators are displayed for roughly the same amount of time, and therefore the user is made aware of the amount of time that is required for the tool to precondition the metadata.

In signal measurement systems that are used in high end, high bandwidth applications, such as, for example, test and measurement equipment and radio telescopes, the FS must be capable of performing write operations at very high speed. This is especially important in gapless, or latency consistent, applications, such as streaming applications. Through experimentation, it has been determined that the storage hardware in such systems may be fast enough to meet these demands, assuming that state-of-the-art hardware is used, but that standard, or non-custom, FSs (e.g., Windows NTFS) are not fast enough (impose too large of an additional performance overhead on the hardware in updating metadata) to prevent the hardware pipeline from overflowing with reasonably cost-effective hardware components and designs.

Accordingly, a need exists for a computer system that runs a non-custom, or standard, FS that reduces write latency in computer systems used in high end, high bandwidth measurement systems. A need also exists for a computer system that runs a non-custom, or standard, FS and that is particularly well suited for reducing write latency in gapless, or highly latency consistent, applications, such as streaming applications.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
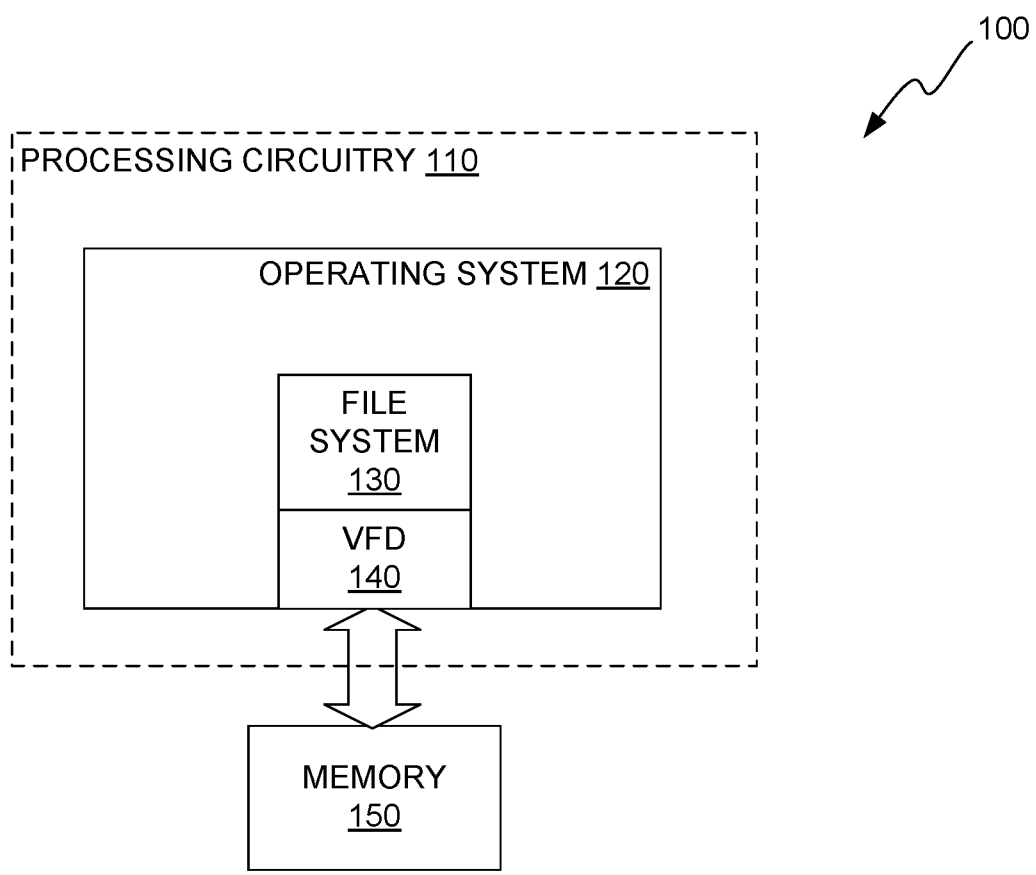
FIG. 1 is a block diagram of a computer system having reduced write latency in accordance with a representative embodiment.

Representative embodiments disclosed herein are directed to a computer system having reduced write latency and to methods for use in computer systems for reducing write latency. The computer system comprises memory and processing circuitry: The processing circuitry is configured to execute a volume filter driver (VFD) that can be switched between a fast termination (FT) mode of operations and a normal "pass through," or quiescent, mode of operations. When the processing circuitry receives input/output (IO) requests to write data to memory while the VFD is in the FT mode of operations, as a "first pass," the VFD causes metadata associated with received IO write requests to be written to a volume of the memory while preventing actual data associated with received IO write requests from being written to the volume of the memory. After the file has been written to the volume, the VFD enters the quiescent mode of operations during which the VFD does not affect IO write requests to the volume, but simply passes all of the IO write requests to the volume, thereby allowing actual data and any lagging and additional metadata updates associated with the file to be written to the volume as a "second pass."

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable and writable storage medium that is capable of storing computer instructions, or computer code, for execution by one or more processors. Memory may also store various types of data, which is of particular focus of the inventive principles and concepts discussed herein. References herein to "memory" or "memory device" should be interpreted as one or more memories or memory devices. The memory may, for example, be multiple memories within the same computer system. The memory may also be multiple memories distributed amongst multiple computer systems or computing devices.

A "processor," as that term is used herein encompasses an electronic component that is able to execute a computer program or executable computer instructions. References herein to a system comprising "a processor" should be interpreted as a system having one or more processors or processing cores. The processor may for instance be a multi-core processor. A processor may also refer to a collection of processors within a single computer system or distributed amongst multiple computer systems. The term "computer," as that term is used herein, should be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

The "standard FS," as that term is used herein, denotes a non-custom FS that is commonly used and understood to operate in combination with a particular (or multiple) operating system(s). For instance, contemporary implementations of the Microsoft Windows operating system default to running the Windows NT FS (hereinafter referred to as "NTFS") and Microsoft is in the process of adding the option of running a FS known as Resilient File System (hereinafter referred to as "ReFS") aimed at users demanding even higher resiliency and reliability. However, in general, standard, widely-used FSs are implemented with a bias toward reliable and flexible operation over ultimate performance. A "custom FS," as that term is used herein, denotes a FS that has been custom designed to address, for example, the shortcomings of a standard FS when used in a particular application such as latency-minimized and latency-consistent operation described herein.

FIG. 1 illustrates a block diagram of a computer system 100 that performs a method for reducing write latency in accordance with a representative embodiment. When the computer system 100, or an application program or device running therein, has data to write to memory 150, an operating system (OS) 120 of the computer system 100 generates a write command that is received by a standard FS 130 of the OS 120. The standard FS may be, for example, NTFS or ReFS. The standard FS 130 then issues input/output (IO) requests that contain the actual data and metadata to be written to a volume of memory 150.

The OS 120 has a volume filter driver (VFD) 140 that is capable of being switched from the aforementioned FT mode of operations to the aforementioned normal, or quiescent, mode of operations, and vice versa. The VFD 140 runs in the kernel of the OS 120. If the VFD 140 is in the quiescent mode of operations, the standard FS 130 allows the data and the metadata to be written to a volume of memory 150 in the normal manner, i.e., in a single pass during which the metadata is conditioned and written by the standard FS 130 in an interspersed and intermittent fashion as the actual data is being written to memory 150. In other words, in the quiescent mode of operations, the VFD 140 has no effect on the IO write requests to the volume of memory 150. In other words, in the quiescent mode of operations, the VFD 140 operates in a "pass through," i.e., quiescent, mode such that the OS 120, the standard FS 130 and memory 150 operate completely as normal except for a very small latency impact due to the insertion of the VFD 140 in the call chain in "pass through" mode.

In accordance with a representative embodiment, the application program or device being executed by the processing circuitry 110 can initiate the switch from the quiescent mode of operations to the FT mode of operations. When the VFD 140 is in the quiescent mode of operations and an application program being executed by processing circuitry 110 instructs the VFD 140 to enter the FT mode of operations, the VFD 140 exits the quiescent mode of operations and enters the FT mode of operations. The FT mode of operations is particularly well suited for enhancing write performance for sequential write applications, such as streaming applications in which data is sequentially captured over a window of time and written to memory. While in the FT mode of operations, if an IO write request received by the VFD 140 from the standard FS 130 contains metadata, the VFD 140 causes the metadata to be written to the volume of memory 150, whereas if an IO write request received by the VFD 140 from the standard FS 130 contains actual data, the VFD 140 does not write the actual data to the volume. The manner in which the VFD 140 differentiates between an IO write request that contains metadata and one that contains actual data is described below with reference to a representative embodiment. After the sequence of IO write requests has been written to the volume, the VFD 140 enters the quiescent mode of operations in which the VFD does not affect IO write requests to the volume.

In accordance with a preferred embodiment, the VFD 140 is designed to optimize the use of non-boot/non-swap memory volumes for minimal latency performance for a single write stream. In such cases, because the application program being executed by the processing circuitry 110 has complete mastery of the volume of memory 150, the application program or a write worker thread of the VFD 140 simply commands the VFD 140 to switch to the quiescent mode of operations after completing its FT mode writes. However, for cases where multiple application programs and their write streams wish to share a volume (likely to be, but not strictly, application programs that are aimed at increasing the average rather than streaming volume performance), widely-known software synchronization techniques can be used to ensure that the VFD 140 is commanded to be in the correct mode of operations for overall coordinated multi-program, multi write stream needs.

The processing circuitry 110 comprises one or more processors (not shown) or processing cores (not shown) configured to execute computer instructions, or code, in the form of software and/or firmware to perform the VFD 140 tasks, which are described below in more detail with reference to the flow diagrams of FIGS. 2-4B. These instructions are stored in memory 150 or in one or more other memory devices that are not shown. The processing circuitry 110 may be implemented by, for example, one or more computer processors, field-programmable gate arrays (FPGAs), application specific integrated circuits (ASICs), or combinations thereof, using software, firmware, hard-wired logic circuits, or combinations thereof. The processing circuitry 110 may be constructed of any combination of hardware, firmware or software architectures, and may include its own memory or memory device (e.g., nonvolatile memory) for storing executable software/firmware executable code that allows it to perform the various functions. In an embodiment, the processing circuitry may comprise a central processing unit (CPU), for example, executing the OS 120. Any such memory or memory devices constitute non-transient computer-readable and writable mediums.

A variety of non-transient computer-readable and writable mediums are suitable for use with the inventive principles and concepts, including, for example, solid state storage devices, magnetic storage devices and optical storage devices. For example, the memory devices may be implemented by any number, type and combination of random access memory (RAM), which may include any number, type and combination of computer readable storage media, such as a disk drive, non-volatile solid state memories such as NAND, NOR and other new types of non-volatile memory such as phase change or other new non-volatile technologies, a writeable CD, a writeable DVD, a writeable universal serial bus (USB) drive, and the like, which are non-transitory (e.g., as compared to transitory propagating signals) and capable of being configured as storage volumes.

Figure 2:
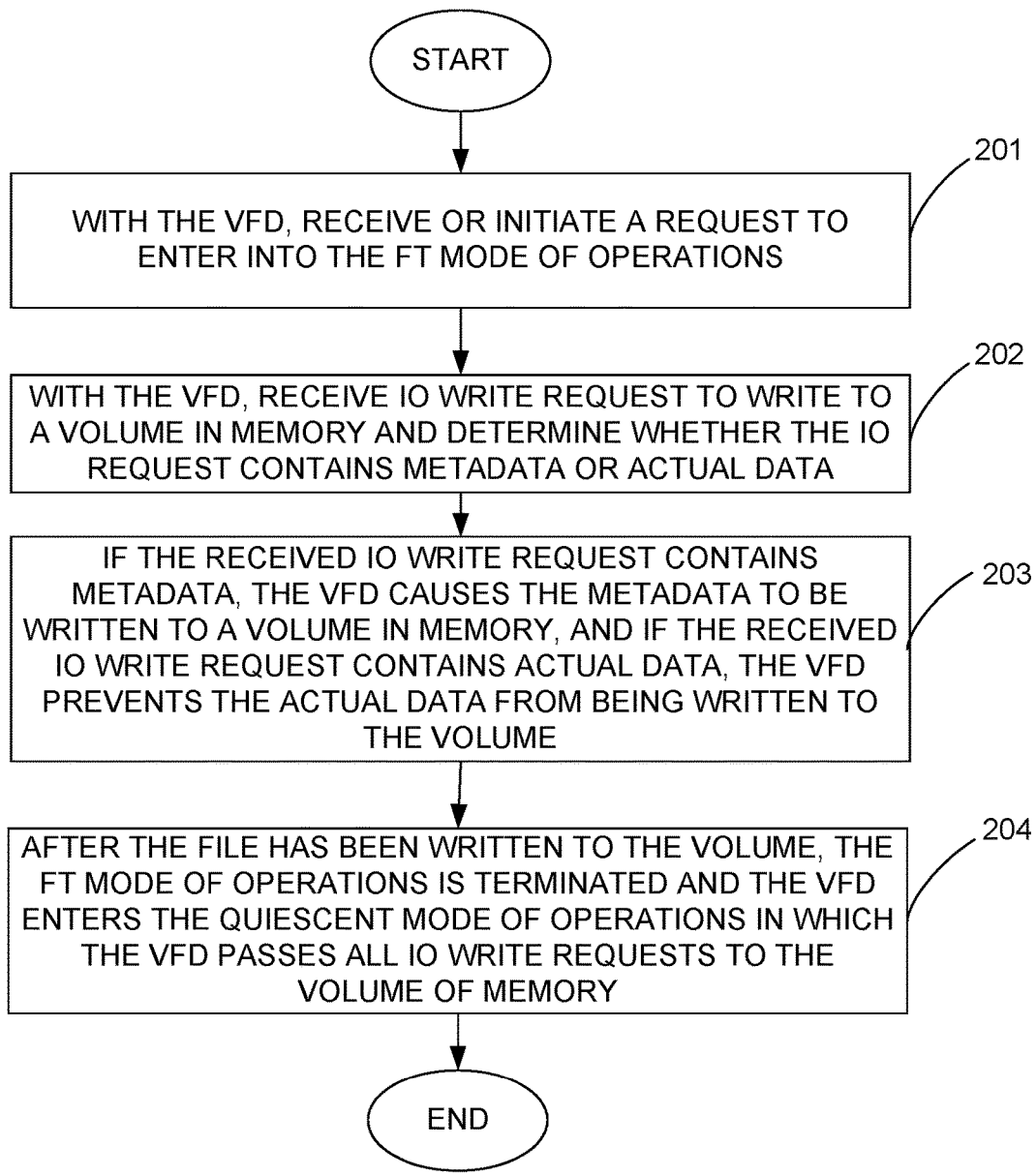
FIG. 2 is a flow diagram that represents the method in accordance with a representative embodiment.

FIG. 2 is a flow diagram that represents the method in accordance with a representative embodiment. The method will be described with reference to the computer system 100 shown in FIG. 1, but it will be understood that the method is not limited to be performed by the computer system 100 shown in FIG. 1. With the VFD 140 being executed by the processing circuitry 110 of the computer system 100, a request is received or initiated to enter the FT mode of operations, as indicated by block 201. The VFD 140, while in the FT mode of operations, receives IO write requests associated with a file to write to a volume of memory 150 and determines whether the received IO write requests contain metadata or actual data, as indicated by block 202. The manner in which this determination is made is described below in more detail with reference to a representative embodiment shown in FIGS. 3A and 4A.

If the received IO write request contains metadata, the VFD 140 causes the metadata to be written to the volume of the memory 150, and if the received IO write request contains actual data, the VFD prevents the actual data from being written to the volume, as indicated by block 203. After the file has been written to the volume, the FT mode of operations is terminated and the VFD 140 enters the quiescent mode of operations in which the VFD 140 passes all IO write requests to the volume, thereby allowing the actual data associated with the file to be written to the volume, as indicated by block 204. Also, as will be described below in more detail with reference to error detection and correction and FIG. 5, if any metadata was not written to the volume, it will be written to the volume during the quiescent mode of operations during which all IO write requests are passed by the VFD 140, regardless of whether they contain actual data or metadata.

Figure 3A:
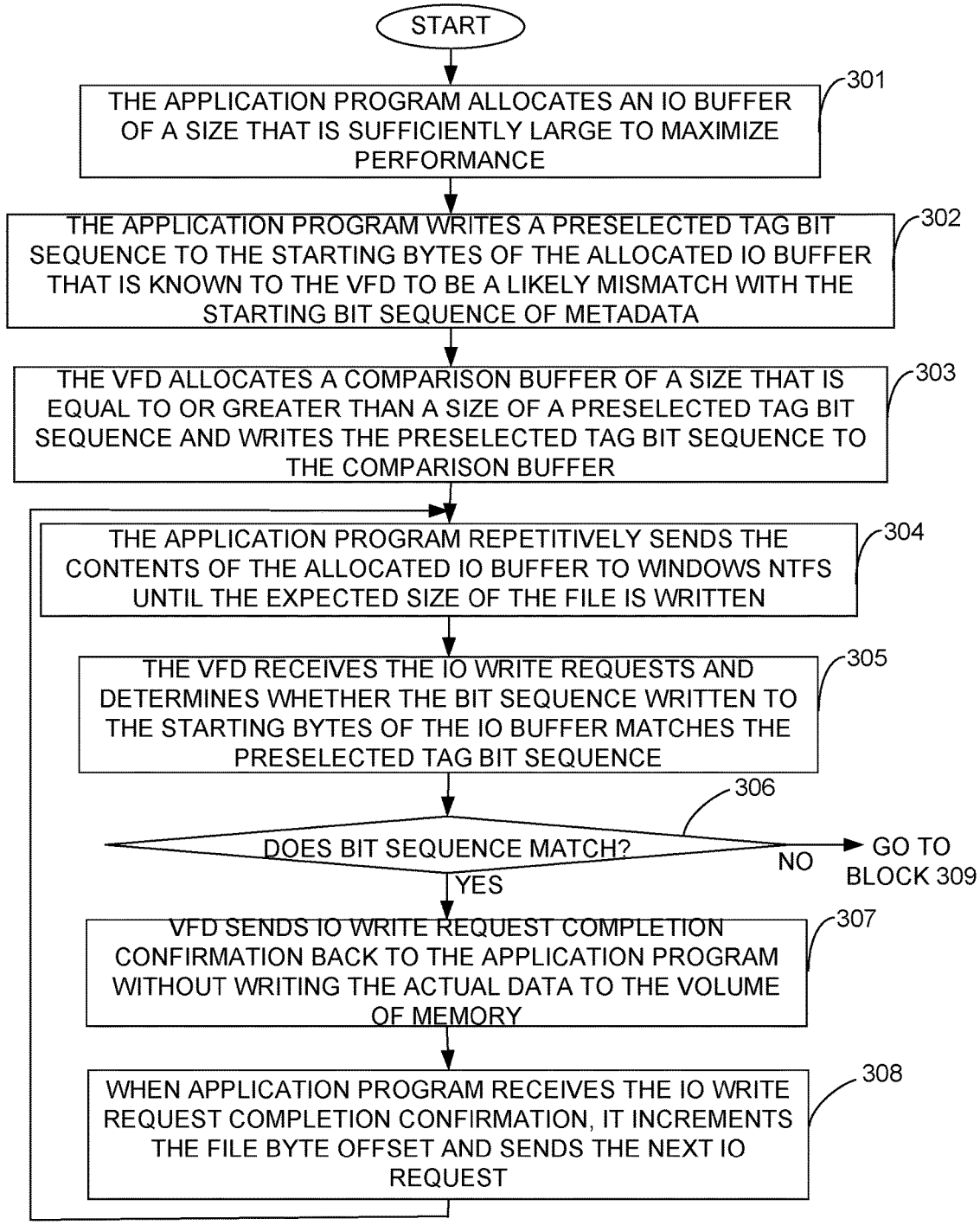
FIGS. 3A and 3B depict a flow diagram of the method in accordance with a representative embodiment in which the standard FS is Windows NTFS, which is a well-known and widely-used standard FS.
Figure 3B:
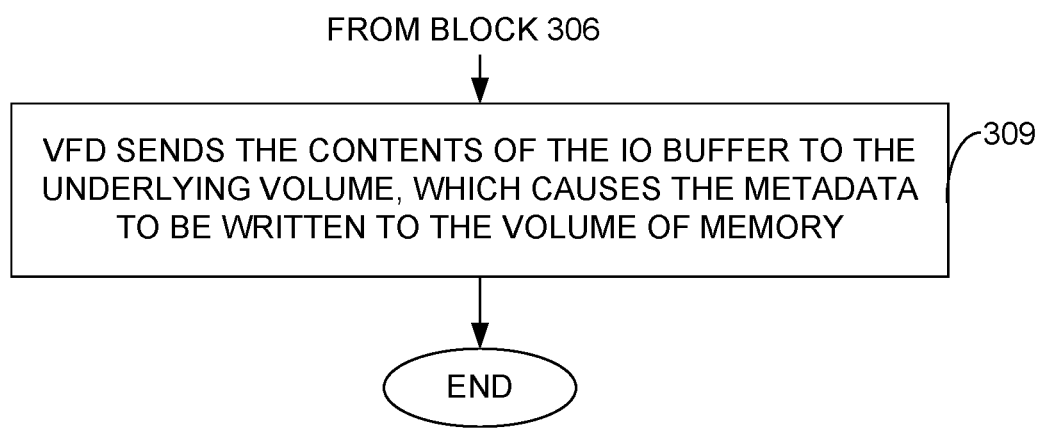
Figure 4A:
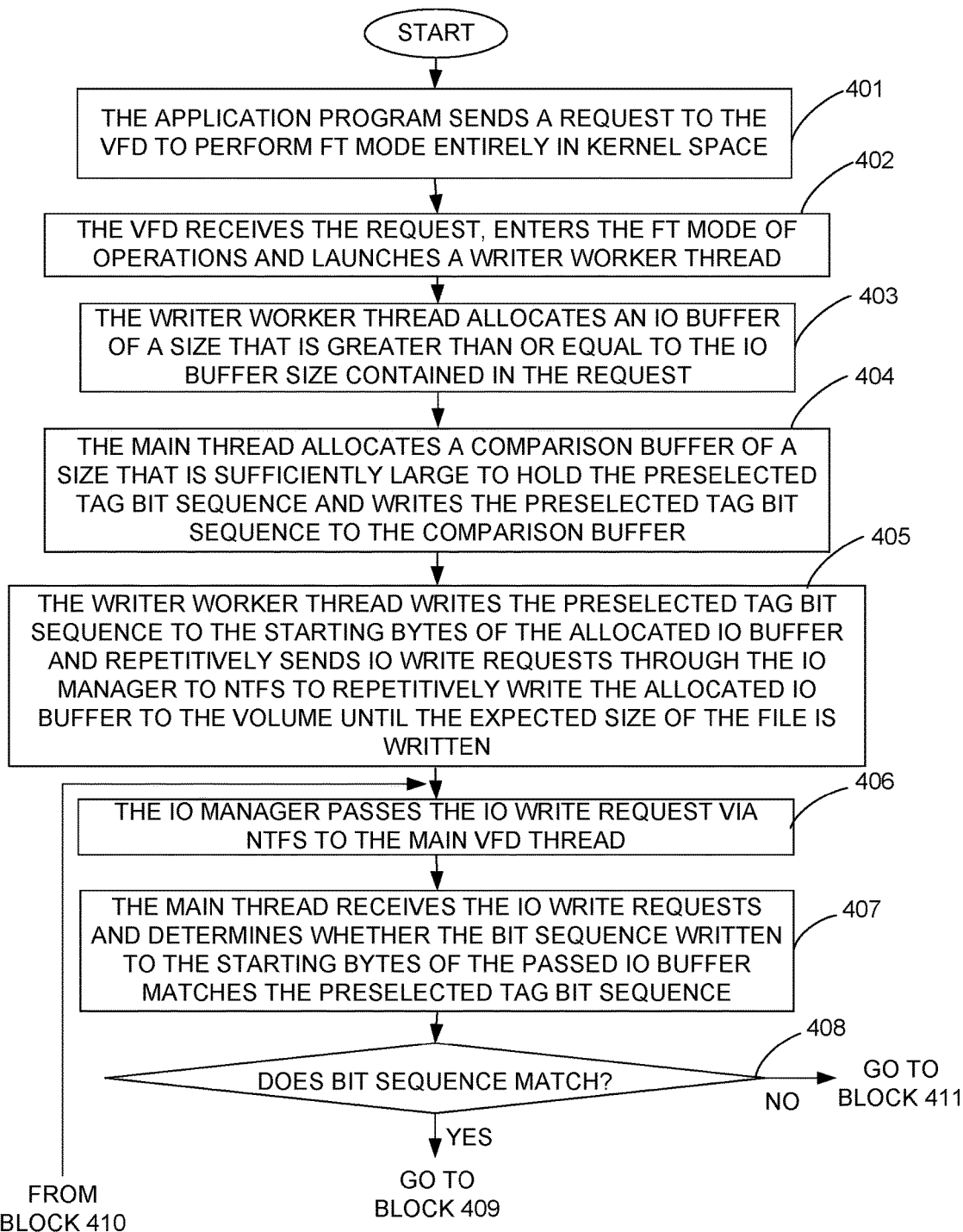
FIGS. 4A and 4B depict a flow diagram of the method in accordance with a representative embodiment in which the standard FS is Windows NTFS and file initialization for the FT mode of operations is performed fully within the VFD running in kernel mode.
Figure 4B:
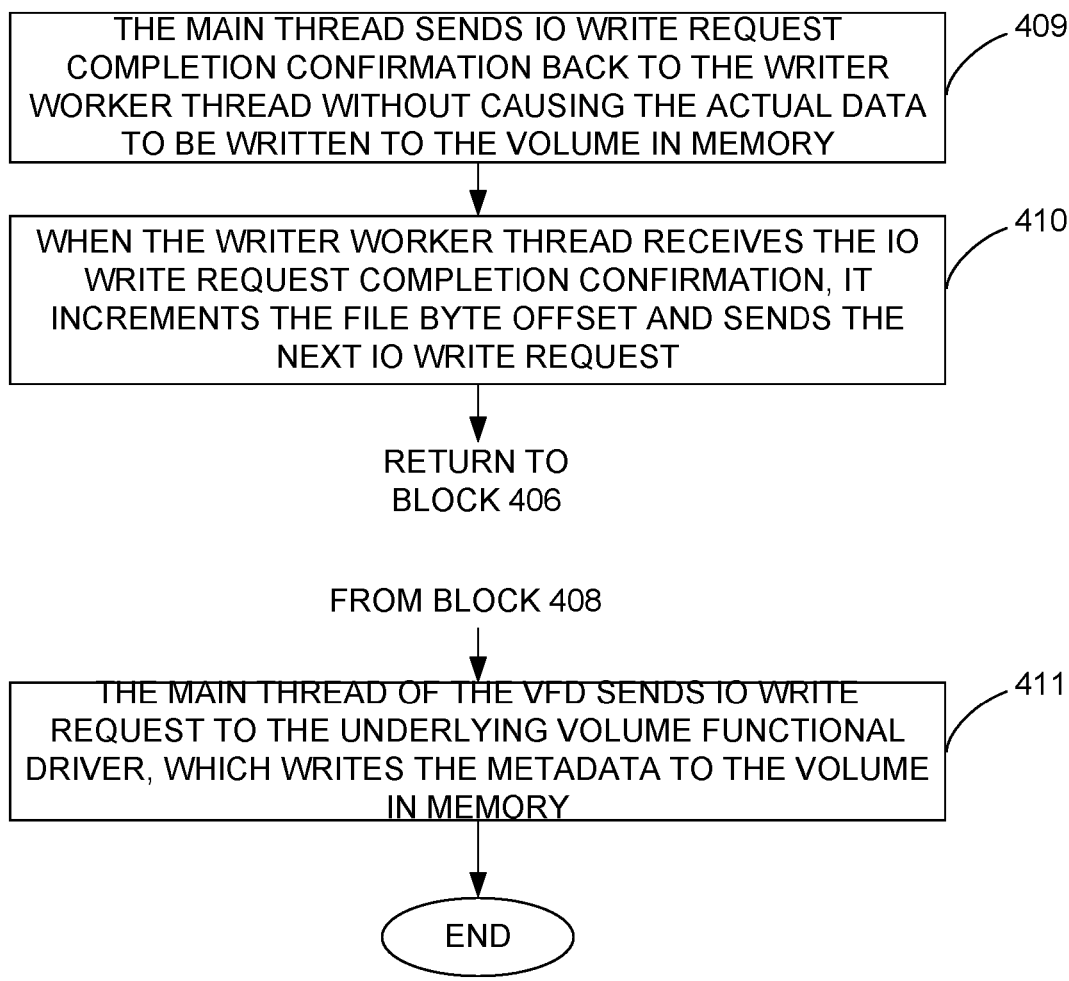

As will be described below in more detail with reference to FIGS. 3A-4B, the VFD 140 exits, or terminates, the FT mode of operations and enters the quiescent mode of operations (block 204) when it is commanded to do so by either the application program (FIGS. 3A and 3B) or by a writer worker thread of the VFD 140 (FIGS. 4A and 4B). Since the application program or the writer worker thread of the VFD 140 writes in non-cached mode, the termination of the FT mode of operations by the application program or by the writer worker thread occurs after all tagged IO buffers have been written to the volume of memory 150. Additional metadata may arrive at the VFD 140 after the termination of the FT mode of operations, but it will simply be passed through normally to memory 150 since the VFD 140 will then be quiescent. A "tagged IO buffer," as that term is used herein, denotes an IO buffer having starting bytes that have been written by either the application program or the writer worker thread of the VFD 140 with a preselected bit sequence that is subsequently inspected by the VFD 140 to determine whether the IO buffer contains metadata or actual data, as will be described below in more detail with reference to FIGS. 3A-4B.

FIGS. 3A and 3B depict a flow diagram of the method in accordance with a representative embodiment in which the standard FS 130 is NTFS, which, as stated above, is a well-known and widely-used standard FS. In accordance with this representative embodiment, the OS 120 is Microsoft Windows OS (hereinafter referred to as "Windows OS"). The Windows OS together with NTFS enables filter drivers to be inserted above memory volumes that can be modified to include the VFD 140. This makes Windows OS and NTFS well suited for being modified to carry out the inventive principles and concepts, although other standard FSs, such as ReFS, for example, are also suitable for this purpose. As indicated above, the FT mode of operations can be requested by an application program or it can be initiated by the VFD 140 after being requested by an application program to run the FT mode of operations entirely in kernel mode. FIGS. 3A and 3B depict the method, in accordance with an embodiment, when an application program requests that the VFD 140 enter the FT mode of operations, whereas FIGS. 4A and 4B depict the method when the VFD 140 initiates the FT mode of operations after being requested by an application program to run the FT mode of operations entirely in kernel mode.

It should be understood that many other operating systems, including, but not limited to, Linux and MacOS could be modified to achieve the essential operation of the present invention, though perhaps not in as simple and elegant manner. For instance, their kernels may need to be modified to add the invention's operation and then re-built/compiled, the complexity of which is not necessary under Windows.

With reference to FIG. 3A, the application program initializes the VFD 140 to operate in the FT mode operations as follows. In accordance with a representative embodiment, the application program allocates an IO buffer of an appropriately large size to achieve maximum performance (e.g., at the present time, this could be multiple megabytes (MB) rather than the more common multiple kilobytes (KB)), as indicated by block 301. The application program writes a preselected tag bit sequence to the starting bytes of the allocated IO buffer that is unique and known to the VFD 140, as indicated by block 302. As indicated above, any IO buffer having starting bytes that have been written with the preselected tag bit sequence are referred to herein as a "tagged IO buffer." In accordance with a representative embodiment, this preselected tag bit sequence comprises multiple bytes and is known to have an extremely high probability of being a "mismatch" to the starting byte sequence signature of NTFS metadata blocks. The preselected tag bit sequence that is used for this purpose will be chosen based on the FS with which the VFD 140 is being implemented and will typically be different for different FSs.

Also as part of the FT mode initialization process, the VFD 140 allocates a comparison buffer of a size that is equal to or greater than the size of the preselected tag bit sequence and writes the preselected tag bit sequence to the comparison buffer, as indicated by block 303. After FT mode initialization, during the FT mode of operations, the application program repetitively writes the contents of the allocated IO buffer to Windows NTFS via an IO Manager (not shown) of the OS 120 until the expected size of the file is written, as indicated by block 304. In accordance with this representative embodiment, this is performed starting at file byte offset 0 using non-cached, or direct IO, requests communicated by the application program to NTFS via a standard Win32 IO Manager application program interface (API), such as WriteFile( ), for example. NTFS receives each of these IO write requests, and because they are non-cached, or direct IO, requests, passes them directly to the underlying volume functional driver. The VFD 140 resides in the volume filter driver chain in the IO pipeline, and therefore receives each IO write request from NTFS and inspects the contents of the IO buffer to determine whether the bit sequence that was written to the starting bytes of the IO buffer matches the preselected tag bit sequence that was written to the comparison buffer, as indicated by block 305. If so, then this means that the contents of the IO buffer contain actual data rather than metadata. Therefore, if it is decided at block 306 that the bit sequences match, the VFD 140 sends an IO completion confirmation back to the application program without writing the contents of the IO buffer to the underlying hardware of memory 150, as indicated by block 307. When the application program receives the IO write request completion confirmation, it increments the file byte offset and sends the next IO write request to NTFS, as indicated by block 308, and then the process returns to block 304 and continues in the manner described above with reference to blocks 304-306.

If the VFD 140 decides at block 306 that the bit sequences are a mismatch, then this means that the IO buffer is not a tagged IO buffer and that the contents of the IO buffer contain metadata. Therefore, if it is decided at block 306 that the bit sequences are a mismatch, the process proceeds to block 309 of FIG. 3B and the VFD 140 sends the contents of the IO buffer to the underlying volume, thereby causing the metadata to be written to the volume of memory.

A variety of modifications may be made to the representative embodiment described above with reference to FIGS. 3A and 3B. In accordance with a representative embodiment, the determination made at blocks 305 and 306 is not made if the destination is a boot volume or swap volume. For added security and system reliability and performance, the VFD 140 preferably ignores attempts to access boot and swap volumes. Therefore, if the VFD 140 detects that the destination volume contained in an IO write request is a boot volume or a swap volume, the VFD 140 ignores the IO write request so that it goes directly to the volume of memory 150. Preferably, the attempted initiation of FT mode to a boot or swap volume returns with the VFD 140 left in quiescent mode.

In accordance with a representative embodiment, for the "second pass" "actual" writing of the user data with the VFD 140 in quiescent mode, the application program may create a "ring" or "endless" storage buffer mode of operation of the written file by resetting the file access pointer to the starting address of the current file of the volume of memory 150 each time the end of the file is reached while still maintaining the performance benefits of the file having been preallocated using the FT mode of operations. This allows various "retained history" modes, sometimes referred to as "triggering" modes, to be performed for recording data streams that are much larger or longer than the size of the allocated file. This feature allows recording of the data stream to be stopped while still being able to subsequently access an amount of the previous history of operation up to the size of the file before the stop, including in a "gapless" way.

FIGS. 4A and 4B depict a flow diagram of the method in accordance with a representative embodiment in which the standard FS 130 is NTFS and file initialization for the FT mode of operations is performed entirely within the kernel space of the OS 120. For maximum FT mode performance, i.e., the shortest FT mode file initialization time for a given file size, the FT mode file initialization is performed fully within the VFD 140, as will now be described in accordance with a representative embodiment. Performing FT mode file initialization entirely within the kernel space eliminates user/kernel space call transitions for each IO buffer that is written, which enhances overall FT mode write performance. This is in contrast to the representative embodiment described above with reference to FIGS. 3A and 3B in which user/kernel space call transitions are performed for each IO buffer that is written.

To start FT mode initialization with maximum performance, the application program sends a request to the VFD 140 to perform FT mode initialization entirely in kernel space, as indicated by block 401. The initialization request that is used for this purpose is typically an input-output control (IOCtl) request and typically includes the volume name, the file name, the size of the IO buffer to be allocated and the requested file size. When the VFD 140 receives this request, the VFD 140 enters the FT mode of operations and launches a writer worker thread to perform file initialization, as indicated by block 402. The writer worker thread allocates an IO buffer of a size that is greater than or equal to the IO buffer size contained in the request and writes the preselected tag bit sequence to the starting bytes of the IO buffer, as indicated by block 403. To further increase FT mode performance over that achieved due to the aforementioned elimination of user/kernel space call transitions for each IO buffer write, the writer worker thread preferably allocates an IO buffer size that is multiples of, e.g., ten times, the IO buffer size contained in the request, provided this is supported by the Windows system configuration.

The main thread of the VFD 140 allocates a comparison buffer that is sufficiently large to hold the aforementioned preselected tag bit sequence and writes the preselected tag bit sequence to the comparison buffer, as indicated by block 404. The writer worker thread of the VFD 140, beginning at file offset 0, repetitively sends IO write requests to NTFS via the IO Manager to write the IO buffer to the volume until the expected size of the file is written, as indicated by block 405. This is all done in kernel space in accordance with this embodiment. For instance, as a simplified example, if the file size requested by the application program is 48 MB (and the volume contains at least that much free space) and the allocated IO buffer size is 16 MB (and the VFD writer worker thread has not allocated an increased buffer size), the file would be completely written using a sequence of three repetitive WriteFile's using that same 16 MB tagged IO buffer. Alternately, the application program may query the memory volume using the FS API to verify that space is available up to the entire remaining space on the volume and repetitively rewrite that IO buffer (plus possibly a remainder size at the end) until the FT mode preallocates the entire remaining memory volume contents for use in the "second pass" actual data write, as would typically be done when the application program does not know in advance how large of an actual data file will be written. In the latter case, this would be followed by a truncation of the file size at the end by the application program to match the actual data written, if appropriate.

When the IO Manager receives each IO write request, it passes the IO write request via NTFS to the main thread of the VFD 140, as indicated by block 406. The main thread of the VFD 140 receives the IO write requests and metadata and inspects the starting bytes of the passed IO buffer to determine whether the bit sequence that was written to the starting bytes of the IO buffer matches the preselected tag bit sequence that the main thread stored in the comparison buffer at block 404, as indicated by block 407. If so, this means that the contents of the IO buffer contain actual data rather than metadata. Therefore, if it is decided at block 408 that the bit sequences match, the main thread sends an IO completion confirmation back to the writer worker thread without writing the contents of the passed IO buffer to the volume of memory 150, as indicated by block 409. When the writer worker thread receives the IO write request completion confirmation, it increments the file byte offset and sends the next IO write request to the IO Manager and NTFS, as indicated by block 410, and then the process returns to block 406 and continues in the manner described above with reference to blocks 406-408.

If the main thread of the VFD 140 decides at block 408 that the bit sequences are a mismatch, this means that the contents of the passed IO buffer contain metadata, and the process proceeds to block 411 of FIG. 4B at which the main thread of the VFD 140 sends the IO write request to the underlying volume, which causes the metadata to be written to the volume of memory 150.

It should be understood from the description provided above that the VFD 140 increases both "latency consistent" (i.e., "streaming") performance and average performance by causing the bulk of metadata creation (e.g., file extents) to occur in an extremely rapid "pre-write," "first pass," of the file, thus allowing the "normal write," "second pass" to be less burdened by FS metadata accesses. The increase in performance can range from tens to hundreds of percent for the types of very high performance (often RAID0-configured at the present time) memory volumes best suited for use with the inventive principles and concepts. The VFD 140 reduces metadata traffic often experienced in known systems that utilize standard FSs, such as NTFS and ReFS, for example, by quickly "pre-conditioning" the metadata in the "first pass" so that during the writing of actual data during the "second pass," the accesses to the metadata cause minimal delays. Consequently, a storage system such as that shown in FIG. 1 that uses the VFD 140 in combination with a standard FS such as NTFS, for example, can achieve performance that is similar or superior to storage systems that use custom FSs that have been designed to optimize write performance while avoiding the cost, complexity, reliability verification and user learning time commonly associated with such custom FSs.

As indicated above, in the FT mode of operations the VFD 140 immediately terminates, e.g., returns the WriteFile call to the user or writer worker thread without actually writing the data passed to the VFD 140 to the volume of memory 150 when the IO buffer has the aforementioned preselected tag bit sequence in the starting bytes. This bit sequence is designed to have an extremely low probability of conflict with the bit sequence that starts metadata block writes. For example, metadata block writes under NTFS commonly begin with the character sequence "FILE," whereas the preselected tag bit sequence written to the starting bytes of the IO buffer during the FT mode of operations never starts with "FILE" and can be increased in length (at the cost of some FT mode performance decrease) to have an extremely low probability of matching any metadata value. Therefore, metadata is nearly always written to the volume of memory 150 as intended. Nevertheless, the inventive principles and concepts include error recovery mechanisms that detect and correct the extremely rare cases where metadata was erroneously not written to the volume, as will be described below with reference to FIG. 5.

Because, during the (FT mode) "first pass," the metadata is written to the volume of memory 150, but the actual data is not, the "first pass" can be completed in a small fraction of the time of normal file writing, as the only traffic being written to the volume is metadata. Metadata is a small fraction of the size of the actual data in use cases where the VFD 140 provides the greatest performance value. Additionally, as indicated above in the scenario described above with reference to FIGS. 4A and 4B, to further increase metadata writing efficiency, the size of the allocated IO buffer is preferably significantly greater than the IO buffer size specified in the application program or device request. In addition to boosting performance, the significantly larger size of the allocated IO buffer results in a further reduction of metadata fragmentation.

Figure 5:
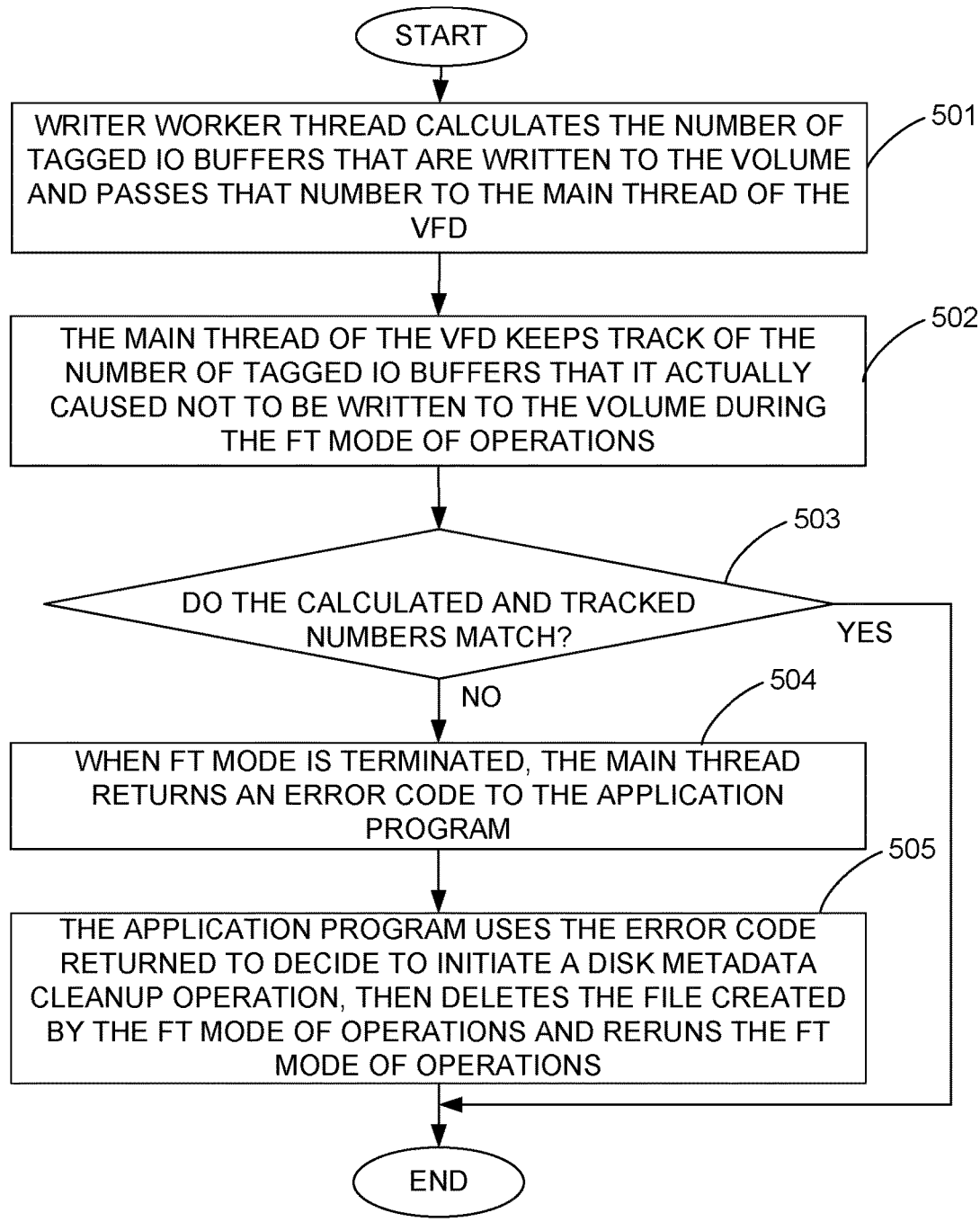
FIG. 5 is a flow diagram that represents an error detection and recovery method in accordance with a representative embodiment for detecting and correcting an error that occurs when writing metadata to the volume.

FIG. 5 is a flow diagram that represents the error detection method in accordance with a representative embodiment for detecting an error that occurs when writing metadata to the volume. In accordance with this embodiment, the error detection method is performed in the VFD 140 in kernel space. A writer worker thread of the VFD 140 calculates the number of tagged IO buffers that will be written to the volume and passes that number to the main thread of the VFD 140, as indicated by block 501. The main thread keeps track of the number of tagged IO buffers that it has actually caused not to be written to the volume during the FT mode of operations, i.e., by the time that the FT mode of operations is terminated, as indicated by block 502. This tracked number is the number of matches that are determined at block 408 of FIG. 4A. The main thread compares the tracked number with the number calculated at block 501 and determines if these numbers are a mismatch, as indicated by block 503. If so, the main thread of the VFD 140 returns an error code to the application program when the FT mode is terminated, as indicated by block 504.

In the case that an error is detected, the error correction is performed by the application program, which simply performs a standard file system integrity correction procedure, such as "chkdsk," for example, to perform a disk metadata cleanup operation and then deletes the file that was created by the FT mode of operations, as indicated by block 505, and then causes the FT mode of operations to re-run. The only negative effect of this is the small amount of time that is consumed to correct some metadata inconsistency (e.g., a run of the "chkdsk" program) since some metadata was incorrectly not written to the volume. Even in the rare case where such an error occurs, there is never a case where actual data is incorrectly written to the volume causing a file that is already on the volume to become corrupted.

Additionally, in accordance with an embodiment, the VFD writer worker thread has a mode where it can increment a counter that generates a count that is concatenated to the preselected tag bit sequence to produce a counter-augmented preselected tag bit sequence for each write of the allocated IO buffer. This counter is continually checked by the main thread of the VFD 140 to provide an early error indication (earlier than the instant in time of completion of the full FT mode "pre-write") of the extraordinarily unlikely condition that a match is detected at block 408 of FIG. 4A even though the IO buffer contents contained metadata.

Although the inventive principles and concepts are not limited to particular use cases or applications, an example of a suitable use case for the VFD 140 is the situation where the user does not know in advance how long a write "stream" will be in size or time duration. In this case, the VFD 140 can be instructed to reserve, i.e., to pre-write, all remaining available space on the volume via the operation of FT mode. The application program first queries the volume for remaining capacity in order to properly instruct/operate the VFD 140 in the FT mode of operations. Following the FT mode of operations, the user proceeds with the quiescent mode of operations to write the stream of actual data until either the stream ends short of the remaining volume capacity or the limit of the remaining volume capacity is reached. In the former case the user's application program knows how much actual data has been written and truncates the file size appropriately. In the latter case the user's application program will either stop and truncate to that entire remaining volume size that was used or do that and then also set the FS write locations back to the beginning of the file and continue writing perhaps multiple iterations, thus forming an endless recording loop. Such an endless recording loop could also be performed in the case where the user knows in advance how large the file is or how long the write stream will be if the remaining volume capacity is insufficient.

Another example of a suitable use case of the VFD 140 is to have an application program perform the FT mode creation of the file and then provide another application with the file name to use to write the actual data. This can address some "gapless multi-stream" data use cases where it would be optimum to avoid running FT mode while another application is running a "gapless" capture to the same volume. Such cases will not be common as the most beneficial use of the inventive principles and concepts is typically to maximally consume the bandwidth of the memory volume with a single "stream" of IO buffer writes when the application program or device is writing the actual data.

While the invention has been illustrated and described in detail in the drawings and foregoing description, such illustration and description are to be considered illustrative or exemplary and not restrictive. The invention is not limited to the disclosed embodiments. For example, a variety of modifications may be made to the computer system 100 shown in FIG. 1 while still achieving the inventive principles and goals, as will be understood by those of skill in the art in view of the description provided herein. Likewise, a variety of modifications may be made to the process depicted in FIGS. 2 and 3A-5 while still achieving the inventive principles and goals, as will be understood by those of skill in the art in view of the description provided herein. Other variations to the disclosed embodiments can be understood and effected by those skilled in the art in practicing the claimed invention, from a study of the drawings, the disclosure, and the appended claims.

What is claimed is:

1. A computer system that reduces an amount of time that is required to write data to memory, the computer system comprising:

memory; and processing circuitry configured to execute a volume filter driver (VFD), wherein when the processing circuitry receives input/output (IO) requests to write data associated with a file to the memory while the VFD is in a fast termination (FT) mode of operations, the VFD causes metadata associated with received IO write requests to be written to a volume of the memory while preventing actual data associated with received IO write requests from being written to the volume of the memory, and wherein after the FT mode of operations is terminated, the VFD enters a quiescent mode of operations during which the VFD passes all IO write requests to the volume, thereby allowing actual data associated with the file to be written to the volume.

2. The computer system of claim 1, wherein the VFD runs in a kernel of a Windows operating system that is executed by the processing circuitry.

3. The computer system of claim 1, wherein the VFD is executed by the processing circuitry as part of a standard file system.

4. The computer system of claim 3, wherein the standard file system is a file system of a group of file systems that includes a Windows NT file system (NTFS).

5. The computer system of claim 1, wherein each IO write request is a request to write contents of a respective IO buffer to the volume in memory, and wherein the VFD runs in a kernel of a Windows operating system that is executed by the processing circuitry, and wherein during an initialization of the FT mode of operations, an application program running on the computer system allocates an IO buffer and writes a preselected tag bit sequence to starting bytes of the allocated IO buffer, and wherein during the initialization of the FT mode of operations, the VFD allocates a comparison buffer and writes the preselected tag bit sequence to the comparison buffer, and wherein during the FT mode of operations, the application program repetitively writes contents of the allocated IO buffer to a standard file system (FS) of the computer system until an expected size of the file has been written to the standard FS.

6. The computer system of claim 5, wherein during the FT mode of operations, the VFD inspects starting bytes of each IO buffer that has been written by the application program to determine whether a bit sequence that has been written to starting bytes of each respective IO buffer matches said preselected tag bit sequence, and wherein if the VFD determines that a mismatch exists between the bit sequence that was written to the starting bytes of the respective IO buffer and said preselected tag bit sequence, the VFD decides that the respective IO write request contains metadata and causes the metadata to be written to the volume.

7. The computer system of claim 6, wherein if the VFD determines that the bit sequence that was written to the starting bytes of the respective IO buffer matches said preselected tag bit sequence, the VFD decides that the respective IO write request contains actual data and sends an indication to the application program that the IO write request has been completed without causing the actual data associated with the respective IO write request to be written to the volume.

8. The computer system of claim 7, wherein after the VFD enters the quiescent mode of operations, the VFD passes all IO write requests to the volume regardless of whether the IO write requests contain actual data or metadata.

9. The computer system of claim 1, wherein each IO write request is a request to write contents of a respective IO buffer to the volume in memory, and wherein the VFD runs in a kernel of a Windows operating system that is executed by the processing circuitry, and wherein the VFD receives a request from an application program that causes the VFD to perform the FT mode of operations entirely in the kernel and that includes a name of the volume, a file name, a file size and a size of an IO buffer, and wherein a main thread of the VFD, during initialization of the FT mode of operations, allocates a comparison buffer having a size that is greater than or equal to a size of a preselected tag bit sequence and writes said preselected tag bit sequence to the comparison buffer, and wherein a writer worker thread of the VFD, during initialization of the FT mode of operations, allocates an IO buffer having a size that is equal to or greater than the size of the IO buffer included in the request received by the VFD from the application program, and wherein during the FT mode of operations, the writer worker thread of the VFD writes said preselected tag bit sequence to starting bytes of the allocated IO buffer and repetitively writes contents of the allocated IO buffer to the volume until an expected size of the file has been written to the volume.

10. The computer system of claim 9, wherein during the FT mode of operations, the main thread of the VFD inspects starting bytes of IO buffers that are sent by the writer worker thread to the volume to determine whether a bit sequence that has been written to starting bytes of each IO buffer matches said preselected tag bit sequence, and wherein if the VFD determines that a mismatch exists between the bit sequence that has been written to starting bytes of the respective IO buffer and said preselected tag bit sequence, the main thread decides that the respective IO write request contains metadata and causes the metadata to be written to the volume.

11. The computer system of claim 10, wherein if the main thread of the VFD determines that a match exists between the bit sequence that has been written to the starting bytes of the respective IO buffer and said preselected tag bit sequence, the main thread of the VFD decides that the respective IO write request contains actual data and sends an indication to the writer worker thread that the respective IO write request has been completed without passing the respective IO write request to the volume.

12. The computer system of claim 11, wherein after the FT mode of operations has been terminated and the VFD has entered the quiescent mode of operations, the VFD passes all IO write requests to the volume.

13. The computer system of claim 11, wherein the IO buffer that is allocated by the writer worker thread has a size that is at least twice the size of the IO buffer included in the request that is received in the VFD from the application program.

14. The computer system of claim 11, wherein the IO buffer that is allocated by the writer worker thread has a size that is equal to or greater than ten times the size of the IO buffer included in the request that is received in the VFD from the application program.

15. The computer system of claim 1, wherein the actual data is gapless, or highly latency consistent, data.

16. The computer system of claim 1, wherein during an initialization of the FT mode of operations, the VFD determines whether the file is associated with a boot or a swap volume, and if so, terminates the FT mode of operations and enters the quiescent mode of operations, thereby causing subsequent IO write requests to be passed through to the volume.

17. The computer system of claim 1, wherein in the FT mode of operations, the VFD performs an error detection process that determines whether an error occurred that resulted in metadata that should have been written to the volume not being written to the volume, and if so, returns an error code to an application program running on the computer system indicating that an error has been detected, thereby allowing the application program to request that a standard file system integrity correction procedure be performed, delete the file and rerun the FT mode of operations.

18. A method for reducing an amount of time that is required to write data to memory of a computer system, the method comprising:
    with a volume filter driver (VFD) being executed by processing circuitry of the computer system, entering a fast termination (FT) mode of operations;
    with the VFD, while in the FT mode of operations, receiving input/output (IO) requests associated with a file to write to memory of the computer system and determining whether the received IO write requests contain metadata or actual data;
    with the VFD, if the received IO write request contains metadata, causing the metadata to be written to a volume of the memory; and
    with the VFD, after the FT mode of operations has been terminated, entering a quiescent mode of operations in which the VFD passes all IO write requests to the volume, thereby allowing actual data associated with the file to be written to the volume.

19. The method of claim 18, wherein each IO write request is a request to write contents of a respective IO buffer to the volume in memory, and wherein the VFD runs in a kernel of a Windows operating system that is executed by the processing circuitry, and wherein the method further comprises:
    with an application program, during an initialization of the Ft mode of operations, allocating an IO buffer and writing a preselected tag bit sequence to starting bytes of the allocated IO buffer; and with the VFD, during an initialization of the FT mode of operations, allocating a comparison buffer of the VFD and writing the preselected tag bit sequence to the comparison buffer.

20. The method of claim 19, further comprising:
with the application program, repetitively writing contents of the allocated IO buffer to a standard file system (FS) of the computer system until an expected size of the file has been written to the standard FS;
with the VFD, inspecting each IO buffer that has been written by the application program to determine whether a bit sequence that has been written to starting bytes of each respective IO buffer matches said preselected tag bit sequence; and
with the VFD, if the VFD determines that a mismatch exists between the bit sequence that was written to starting bytes of the respective IO buffer and said preselected tag bit sequence, deciding that the respective IO write request contains metadata and causing the metadata to be written to the volume.

21. The method of claim 20, further comprising:
with the VFD, if the VFD determines that the bit sequence that was written to the starting bytes of the respective IO buffer matches said preselected tag bit sequence, deciding that the respective IO write request contains actual data; and
with the VFD, sending an indication to the application program that the IO write request has been completed without causing the actual data associated with the respective IO write request to be written to the volume.

22. The method of claim 21, further comprising:
in the VFD, after the file has been written to the volume, terminating the FT mode of operations and entering the quiescent mode of operations, and wherein during the quiescent mode of operations, the VFD passes all IO write requests to the volume.

23. The method of claim 18, wherein the VFD runs in a kernel of a Windows operating system that is executed by the processing circuitry, and wherein the method further comprises:
with a writer worker thread of the VFD, prior to the VFD writing to the volume, receiving an initialization request from an application program that causes the VFD to perform initialization of the FT mode of operations in the kernel and that includes a name of the volume, a file name, a file size and a size of an IO buffer;
with the writer worker thread, prior to the VFD writing to the volume during an initialization of the FT mode of operations, allocating an IO buffer and writing a preselected tag bit sequence to starting bytes of the allocated IO buffer; and
with a main thread of the VFD, prior to the VFD writing to the volume during an initialization of the FT mode of operations, allocating a comparison buffer and writing said preselected tag bit sequence to the comparison buffer.

24. The method of claim 23, further comprising:
with the writer worker thread, during the FT mode of operations, repetitively sending IO write requests containing contents of the allocated IO buffer to a standard file system of the computer system to write the contents to the volume until the file size included in the initialization request has been written;
with the main thread, during the FT mode of operations, comparing starting bytes of each IO write request to the preselected tag bit sequence that was written by the main thread to the comparison buffer to determine whether a bit sequence that was written to starting bytes of the respective IO buffer matches the preselected tag bit sequence; and
with the main thread, if the main thread determines that a mismatch exists between the the bit sequence that was written to the starting bytes of the IO buffer and the preselected tag bit sequence, deciding that the respective IO write request contains metadata and causing the metadata to be written to the volume.

25. The method of claim 24, further comprising:
with the main thread, during the FT mode of operations, if the main thread determines that a match exists between the bit sequence that was written starting bytes of the IO buffer and the preselected tag bit sequence that was written to the comparison buffer, deciding that the respective IO write request contains actual data and sending an indication to the writer worker thread that the IO write request has been completed without causing the actual data associated with the respective IO write request to be written to the volume.

26. The method of claim 18, further comprising:
in the VFD, during the FT mode of operations, performing an error detection process that determines whether an error occurred that resulted in metadata that should have been written to the volume not being written to the volume, and if so, returning an error code to an application program running on the computer system indicating that an error has been detected, thereby allowing the application program to request that a standard file system integrity correction procedure be performed, to delete the file and to rerun the FT mode of operations.

27. A non-transitory computer-readable medium having a computer program stored thereon for performing volume filter driver (VFD) operation that reduces an amount of time that is required by a computer system to write data to memory of the computer system, the computer program being embodied on a non-transitory computer-readable medium, the computer program comprising:
with a first code segment of the VFD, receiving a request from an application program being executed by processing circuitry of the computer system to enter a fast termination (FT) mode of operations;
with a second code segment of the VFD, while in the FT mode of operations, receiving input/output (IO) write requests associated with a file to write to memory of the computer system and determining whether the received IO write requests contain metadata or actual data;
with a third code segment of the VFD, if the received IO write request contains metadata, causing the metadata to be written to a volume of the memory, whereas if the received IO write request contains actual data, preventing the actual data from being written to the volume of the memory; and
with a fourth code segment of the VFD, after the file has been written to the volume, terminating the FT mode of operations and entering a quiescent mode of operations in which the fourth code segment passes all IO write requests to the volume.

* * * * *